(12) United States Patent
Berthoud et al.

(10) Patent No.: US 7,054,428 B1
(45) Date of Patent: May 30, 2006

(54) TELEPHONE CALL INTERUPTION REQUEST VIA INTERNET

(75) Inventors: Charles William Berthoud, Nazareth, PA (US); Lakshmi Narayana Jampanaboyana, Allentown, PA (US); Steven C. Szep, Orefield, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/349,708

(22) Filed: Jul. 8, 1999

(51) Int. Cl.
*H04M 3/42* (2006.01)

(52) U.S. Cl. .............................. 379/215.01; 379/88.17; 379/900

(58) Field of Classification Search ............. 379/88.17, 379/88.19, 88.21, 93.23, 207.13, 215.01, 379/900, 211.01, 211.02, 265.09
See application file for complete search history.

(56) References Cited

U.S. PATENT DOCUMENTS

| | | | | |
|---|---|---|---|---|
| 4,847,890 A | * | 7/1989 | Solomon et al. ......... | 379/88.21 |
| 5,519,767 A | * | 5/1996 | O'Horo et al. ........... | 379/67.1 |
| 5,557,658 A | * | 9/1996 | Gregorek et al. ........ | 379/88.25 |
| 5,796,806 A | * | 8/1998 | Birckbichler .............. | 379/88.2 |
| 5,805,587 A | * | 9/1998 | Norris et al. .............. | 370/352 |
| 5,818,919 A | * | 10/1998 | Berberich, Jr. et al. . | 379/211.02 |
| 5,982,774 A | * | 11/1999 | Foladare et al. ........... | 370/401 |
| 6,038,443 A | * | 3/2000 | Luneau ....................... | 455/415 |
| 6,122,347 A | * | 9/2000 | Borland ....................... | 379/70 |
| 6,144,644 A | * | 11/2000 | Bajzath et al. .............. | 370/259 |
| 6,282,275 B1 | * | 8/2001 | Gurbani et al. ........ | 379/142.06 |
| 6,301,349 B1 | * | 10/2001 | Malik ..................... | 379/211.02 |
| 6,343,121 B1 | * | 1/2002 | Infosino ................ | 379/215.01 |
| 6,377,668 B1 | * | 4/2002 | Smock et al. .......... | 379/142.08 |
| 6,396,908 B1 | * | 5/2002 | O'Donovan et al. ..... | 379/88.18 |
| 6,498,841 B1 | * | 12/2002 | Bull et al. ............. | 379/142.08 |

\* cited by examiner

*Primary Examiner*—Bing Q. Bui

(57) ABSTRACT

Apparatus and method for notifying an Internet user of an attempted incoming telephone call to the same telephone line used to interconnect the called-but-busy party with the Internet. The disclosed embodiment comprises an Internet communication module and a message recorder/IP formatter at an Internet Service Provider (ISP). The ISP is contacted, either directly by a calling party via a telephone call, or by the central office via a telephone call, and a desired called-but-busy party is identified (e.g., with a telephone number). The ISP provides a notification message to the called-but-busy user via the data communication link established for Internet use between the called-but-busy party and their servicing ISP. The notification message may be textual (e.g., an e-mail message) and/or audible (e.g., a ".wav" file attached to an e-mail message). Moreover, the notification message may be passive, requiring the called-but-busy party to actively receive the notification request, e.g., by retrieving their e-mail. Alternatively, the notification message may be automatically activated upon receipt by the called-but-busy Internet user, e.g., using a self-executing JAVA applet or the like.

44 Claims, 4 Drawing Sheets

INTERNET USER
(ATTEMPTED CALLED PARTY)

FIG. 3

| ENTERED TELEPHONE OR PIN NUMBER | TEXTUAL OR AUDIBLE MESSAGE ? | MESSAGE | E-MAIL ADDRESS |
|---|---|---|---|
| 555-1234 | E-MAIL TEXTUAL | "PLEASE DISCONNECT, CALLING PARTY TRYING TO REACH YOU." | sam@home.com |
| 9876 | E-MAIL W/ATTACHED AUDIBLE FILE | "LOG OFF, YOUR FATHER IS TRYING TO CALL HOME." | john@home.com |
| 555-5678 | E-MAIL TEXTUAL | "LOG OFF IMMEDIATELY, FAMILY MEMBER TRYING TO CALL." | sam@home.com |
| 5432 | SELF-EXECUTING AUDIBLE | "EMERGENCY TELEPHONE CALL. DISCONNECT IMMEDIATELY." | sam@aol.com |
| ETC. | ETC. | ETC. | ETC. |

TELEPHONE CALL INTERUPTION REQUEST VIA INTERNET

BACKGROUND OF THE INVENTION

1. Field of the Invention

This invention relates generally to an Internet communication technique. More particularly, it relates to a technique for notifying a person accessing the Internet of an incoming telephone call attempt from a calling party.

2. Background of Related Art

For users of the Internet, access to the Internet often occurs over the same telephone line that is used to place and receive telephone calls. For instance, in a business or household with only one telephone line, once the telephone line is connected to the Internet, no other telephone calls (including Caller ID) can be received on that single telephone line. In fact, a person attempting to call that particular party will receive a busy signal, and will be required to repeatedly call until the user disconnects by chance from the Internet, allowing a subsequent telephone call to go through.

FIG. 1 illustrates a conventional single line telephone system capable of allowing a user to access and connect to the Internet over the publicly switched telephone network (PSTN).

In particular, in FIG. 1, a single line telephone system 11 has a handset 13, which in effect is connected to a personal computer system 15 or the like through a modem connection 17. Modern computers no longer use acoustical coupling methods, but rather use a direct connection between a telephone line and a modem. The depiction in FIG. 1 is used to emphasize that the telephone line is in an off-hook condition when connected to the Internet.

The single line telephone system 11 connects the personal computer system 15 to the Internet 21 using a connection to an Internet Service Provider (ISP) connected to the PSTN 19. The personal computer system 15 can be connected to the Internet 21 when desired, and for as long as desired, by the user of the single line telephone system 11. Oftentimes, Internet-related telephone connections can last for many hours at a time.

When a calling party on another telephone system 23 connected to the publicly switched telephone network 19 attempts to call the single line telephone system 11 at a time when the user of the single line telephone system 11 has already accessed and connected the telephone system 11 to the Internet 19, the user of the other telephone system 23 will receive a busy signal. Unfortunately, the calling party must continue to redial and attempt connection with the user of the single line telephone system 11 until the user of the single line telephone system 11 disconnects from the Internet or otherwise hangs up the handset 13 of the single line telephone system 11. Given the generally lengthy nature of Internet-related telephone connections, the process of continually re-dialing the user of the single telephone line system 11 is not only inconvenient to the calling party, but could have serious consequences if the calling party has an emergency or other important message which must be conveyed to the user of the single line telephone line system 11.

Accordingly, there exists a need for an apparatus and method for notifying a user of a single line telephone system of an incoming telephone call from a calling party when the user is accessing the Internet with the single line telephone system.

SUMMARY OF THE INVENTION

In accordance with the principles of the present invention, apparatus for notifying a called-but-busy party of an incoming telephone call attempt over a telephone line while the called-but-busy party is accessing the Internet over the same telephone line comprises an Internet communication module, and a message formatter. The Internet communication module is adapted to cause the message formatter to send a notification message to the called-but-busy party upon request from a remote telephone user.

A method for notifying an Internet user of a telephone line that a calling party is attempting to connect with the Internet user in accordance with another aspect of the present invention comprises uniquely identifying an Internet user via a telephone call, and notifying the uniquely identified user that the calling party is attempting to call the Internet user over the telephone line.

Another method for notifying an Internet user of a telephone line that a calling party is attempting to connect with the Internet user comprises determining at a central office a likelihood that the Internet user is connected with the Internet, and notifying an attempted calling party to the Internet user of the likelihood.

BRIEF DESCRIPTION OF THE DRAWINGS

Features and advantages of the present invention will become apparent to those skilled in the art from the following description with reference to the drawings, in which:

FIG. 3 is a table of various exemplary audible and/or textual messages for notifying the user of a single line telephone system of an incoming telephone call via the computer the user is using to access the Internet, e.g., with the apparatus shown in FIG. 2, in accordance with the principles of the present invention.

DETAILED DESCRIPTION OF ILLUSTRATIVE EMBODIMENTS

The present invention provides an apparatus and method capable of notifying a user of a single line telephone system of an attempted or desired incoming telephone call when the user is utilizing the single line telephone system to access the Internet. The apparatus and method according to the present invention allows someone trying unsuccessfully to call an Internet user to call the appropriate Internet Service Provider (ISP) to cause a textual announcement message or audible sound file message, e.g., .WAV file, to be sent to the user interface (e.g., display) of a desired "called-but-busy" user of the single line telephone system.

Figure 1:
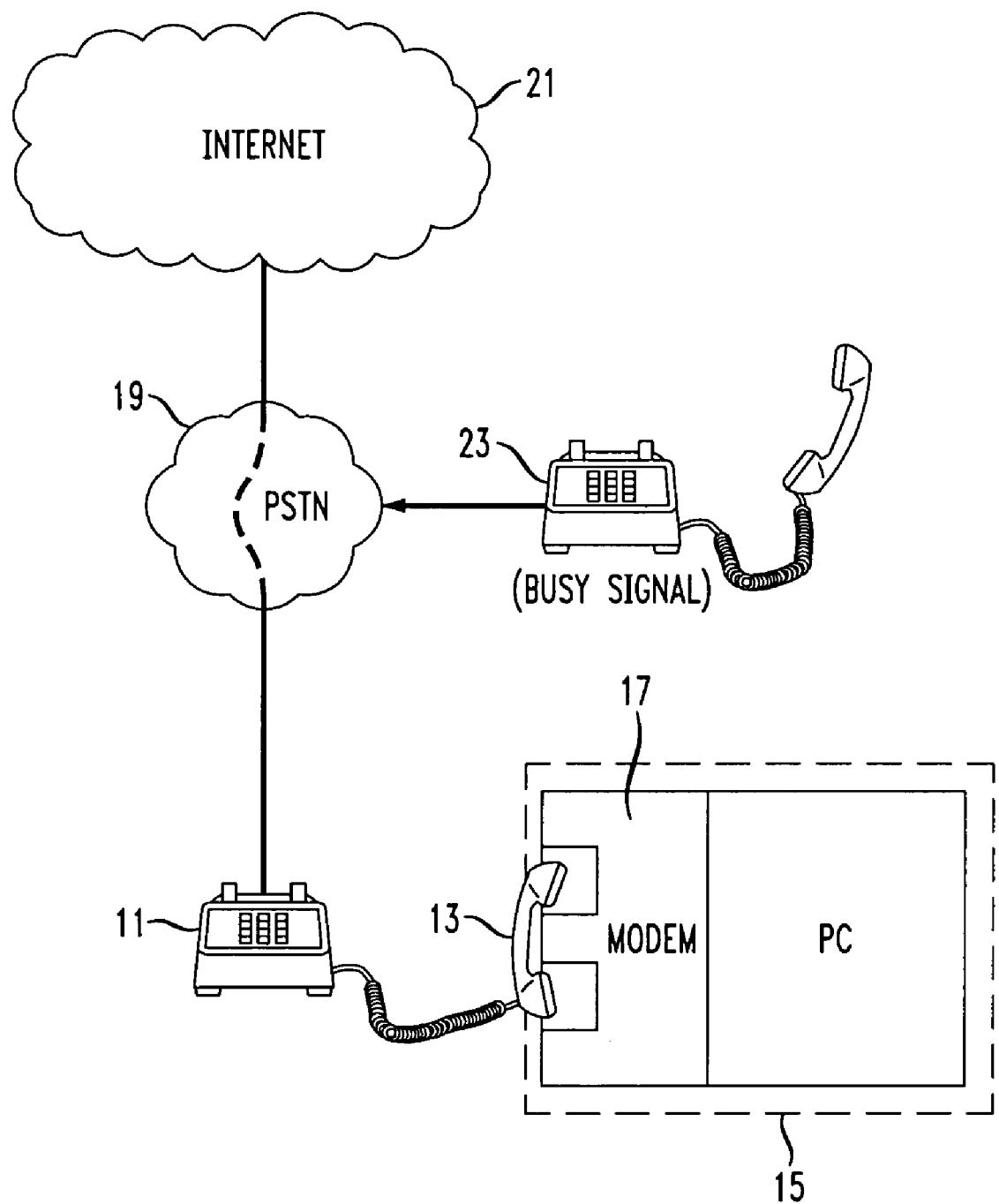
FIG. 1 illustrates a conventional single line telephone in an established connection between a computer modem and the Internet via the PSTN while another telephone user attempts to place a call to the Internet user via the same telephone line.
Figure 2:
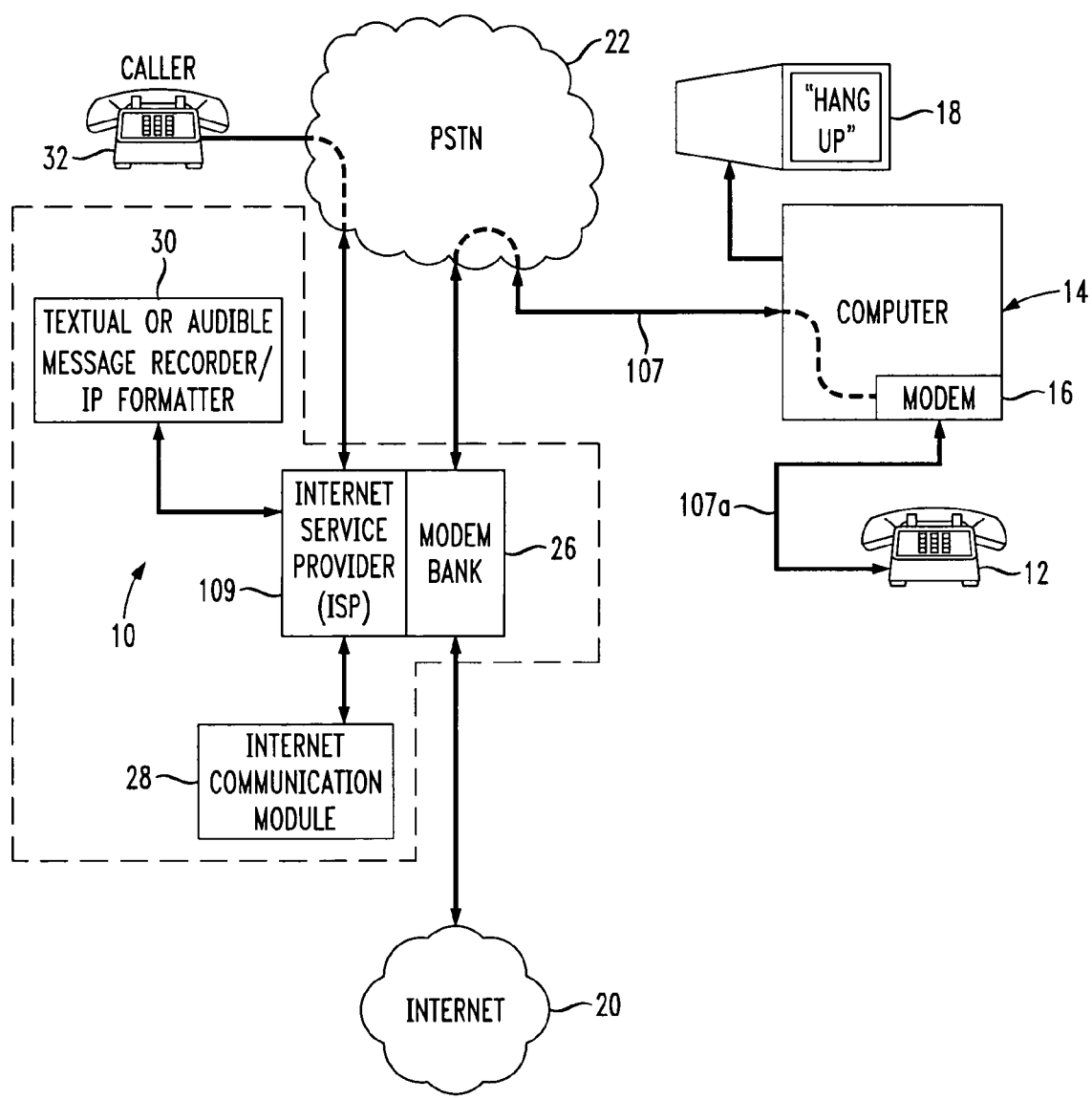
FIG. 2 illustrates an embodiment of an apparatus which is capable of notifying a user of a single line telephone system already active in a connection to the Internet of the desire of a particular caller to call the user via the same telephone line, in accordance with the principles of the present invention.

FIG. 2 illustrates an apparatus, indicated generally at 10, capable of notifying an Internet user of a telephone 12 of an attempted or desired incoming telephone call from a caller at telephone 32 when the user is already connected to the Internet 20 using the same telephone line 107, in accordance with the principles of the present invention.

In the embodiment of FIG. 2, the caller at telephone 32 attempts to call the Internet user at telephone 12, but the telephone 12 is unavailable for receiving telephone calls because its telephone line 107 is tied up with a data connection between an associated computer 14 and the Internet 20. The Internet connection is established through the public switched telephone network (PSTN) 22 and a modem bank 26 at an appropriate ISP 109.

The modem 16 in the computer 14 provides the associated telephone 12 with access to the telephone line 107. Of course, the telephone 12 may be connected directly to the telephone line 107 as is well known in the art.

As shown in FIG. 2, the modem 16 currently has the telephone line 107 in an off-hook condition preventing use of the telephone line 107 and associated telephone 12 to receive any telephone calls. In addition to the modem 16, the computer system 14 typically includes a monitor 18 or other user interface device.

The computer system 14 is provided access to a receiving modem in the Internet 20, e.g., in a modem bank 26 of a servicing Internet Service Provider (ISP), via the PSTN 22.

Given the scenario depicted in FIG. 2, the caller at telephone 32 would conventionally be provided with a busy signal when attempting to call the Internet user's telephone 12. However, in accordance with the principles of the present invention, the caller 32 is provided with an ability to notify the Internet user of their attempted telephone call through the Internet. Moreover, in one embodiment, the appropriate central office in the PSTN 22 can detect the presence of data communications on the telephone line 107 attempted to be called, and audibly notify the caller at telephone 32 with a canned message. The central office may be provided with sufficient information to, upon request by the caller, call the called party's ISP 109 and request that an appropriate notification message be sent to the Internet user's user interface device, e.g., display 18.

To receive and act on such request for an appropriate notification message to be sent to a particular subscriber to the ISP 109, the ISP 109 includes an Internet communication module 28, and a textual or audible message recorder/IP formatter 30.

The Internet communication module 28 receives requests for notification messages from would-be callers (or an appropriate central office), and prompts the caller for input relating to the identity of the Internet user. For instance, upon receipt of a telephone call from the would-be caller to send the notification message, the Internet communication module 28 causes an audible prompt for a unique identifying number of the Internet user, which the caller inputs using the keypad of their telephone 32. Appropriate identifying numbers include a telephone number of the Internet user, or a personal identity number (PIN) specifically assigned to the Internet user. Alphanumeric identifying numbers are possible, but limited to the uniqueness provided by the standard 12-key touch tone keypad.

Upon identification of the appropriate Internet user to the Internet communication module 28 at the ISP 109, the caller may be provided with the opportunity to select from a plurality of possible notification messages, e.g., using keypad input. Alternatively, a standard notification message can be formed using call related information regarding the caller (e.g., Caller ID type information such as telephone number and/or household or business name) and sent as a text message to the Internet user.

The notification message may be a text message and/or an appropriately digitized audible message, e.g., in the form of a ".wav" file. The notification message may be communicated to the Internet user using conventional forms of communication, e.g., using e-mail, or may be communicated to the Internet user via a localized communication means, e.g., using a chat room provided by a particular ISP 109. When using e-mail, a textual notification message may be contained in the body of the e-mail, and/or a file containing a digitized notification message may be attached to the e-mail for playback using an appropriate application already resident on the Internet user's computer 14.

The selected notification message is appropriately formatted by the textual or audible message recorder/IP formatter module 30. The formatter module 30 may include a plurality of pre-recorded audible and/or textual notification messages for the caller to choose from, or may allow the caller to record and digitize a personalized audible message.

The formatter module 30 also formats the selected notification message into an appropriate form for the ISP's particular mode of communication. For instance, if e-mail is the form of communication used by the particular ISP, then the formatter module 30 formats an appropriate e-mail message together with an attached ".wav" or other digitized audio file if necessary, and sends it to the appropriate e-mail address on file for the particular Internet user.

The e-mail address may be maintained in an appropriate table for access by the formatter module 30.

In operation, a caller using the telephone 32 may unsuccessfully attempt to call the telephone 12 of the Internet user. Either knowing the propensity of the attempted called party, or after being informed of likely Internet usage by the central office by the called Internet user, the caller can hang up, and then place another telephone call to a specially designated, predetermined telephone number (e.g., in a modem bank 26) at the ISP 109. Upon appropriate prompting initiated by the Internet communication module 28, the caller at telephone 32 would input a unique identifying number for the Internet user, e.g., a telephone number used in this case as a special designate for the Internet user. The caller may also be provided with the opportunity to select or record a particular notification message.

In response, the formatter module 30 selects and formats the appropriate notification message, and sends it to the Internet user over the data communication line established between the Internet user and the ISP 109.

The Internet user, upon receipt of the notification message using an appropriate e-mail application, ISP-provided access software, etc., can respond appropriately and decide whether or not to hang-up the Internet connection.

The notification message can be passive, e.g., as in a textual e-mail message which must be accessed by the user, or can activate itself upon receipt using, e.g., a self-executing JAVA applet.

The unique identifying number of the Internet user may be one which is arbitrarily assigned and personally provided ahead of time by Internet users to those potential callers they know or wish to allow such priority access to them. Alternatively, the unique identifying number may be the Internet user's telephone number, which is maintained in an appropriate look-up table for access by the Internet communication module 28 at the ISP 109.

For instance, FIG. 3 shows an exemplary table setting forth examples of telephone numbers of those Internet users wishing to make available to would-be callers Internet Interruption access in accordance with the principles of the present invention.

In particular, in FIG. 3, a plurality of entries may be maintained in an appropriate table. Each entry contains an appropriate unique identifying number (e.g., telephone number, PIN number, etc.) of a subscribing Internet user. Moreover, to provide flexibility in the mode of communication between the ISP 109 and the Internet user, the table may include a preferred form of communication and/or message. For instance, a party at "555-1234" may prefer Internet interruption using a textual e-mail message, and the message may be pre-stored as "Please disconnect, calling party trying to reach you." A second subscriber having a second entry in the table shown in FIG. 3 may prefer to receive an e-mail notification message with an attached audible file. A third subscriber at "555-5678" may prefer to receive a standard e-mail message, and a fourth subscriber having a PIN number of 5432 may prefer to receive a self-executing audible applet. As depicted in the last column, each entry of the table may preferably include an appropriate e-mail address for use by the formatter module 30.

When received by the Internet user, depending on the type of notification message, the Internet user will be notified of the requested Internet interruption by a would-be caller.

The Internet user may preferably be provided with information (e.g., call related information such as Caller ID information) regarding the identity of the requesting would-be caller, to help in their decision of whether or not to interrupt their Internet session and hang up the telephone line 107.

In a another embodiment of the present invention, the telephone company central office may detect likely Internet usage of the telephone line 107, and inform such Internet usage to a would-be caller along with the busy signal otherwise provided to the telephone 32. For instance, the telephone company central office may include a modem signal detector, e.g., capable of detecting a quadrature amplitude modulation (QAM) signal, as a basis for informing the would-be caller that the user of the telephone line 107 they have called is using their telephone line 107 to connect to the Internet.

The determination of likely Internet usage based on the detection of a QAM signal may be qualified with other parameters to conclude that there is likely Internet usage by the Internet user. For instance, the telephone company central office may monitor the amount of time of a given telephone call by the Internet user, and if greater than a predetermined length, e.g., if greater than one (1) hour, then conclude that the Internet user is likely connected to the Internet 20. In such event, would-be callers could be informed of the likely Internet usage using an appropriate pre-recorded message from the telephone company central office.

The telephone company central office may also provide such automated service to the Internet user. For instance, upon receipt of an attempted incoming telephone call to the Internet user while in an established Internet session, the telephone company central office may itself contact the appropriate ISP 109 for the Internet user and provide a notification message containing either general information and/or call related information such as Caller ID information.

In the event that the telephone company central office notifies the Internet user engaged in an Internet session, the fact that the Internet user may likely be using the Internet may be kept confidential from the caller using a general message to the would-be calling party, e.g., "We're sorry, the party you called is busy, but if you press "#98" a notification will be sent to the called-but-busy party containing your caller ID information."

Figure 4:
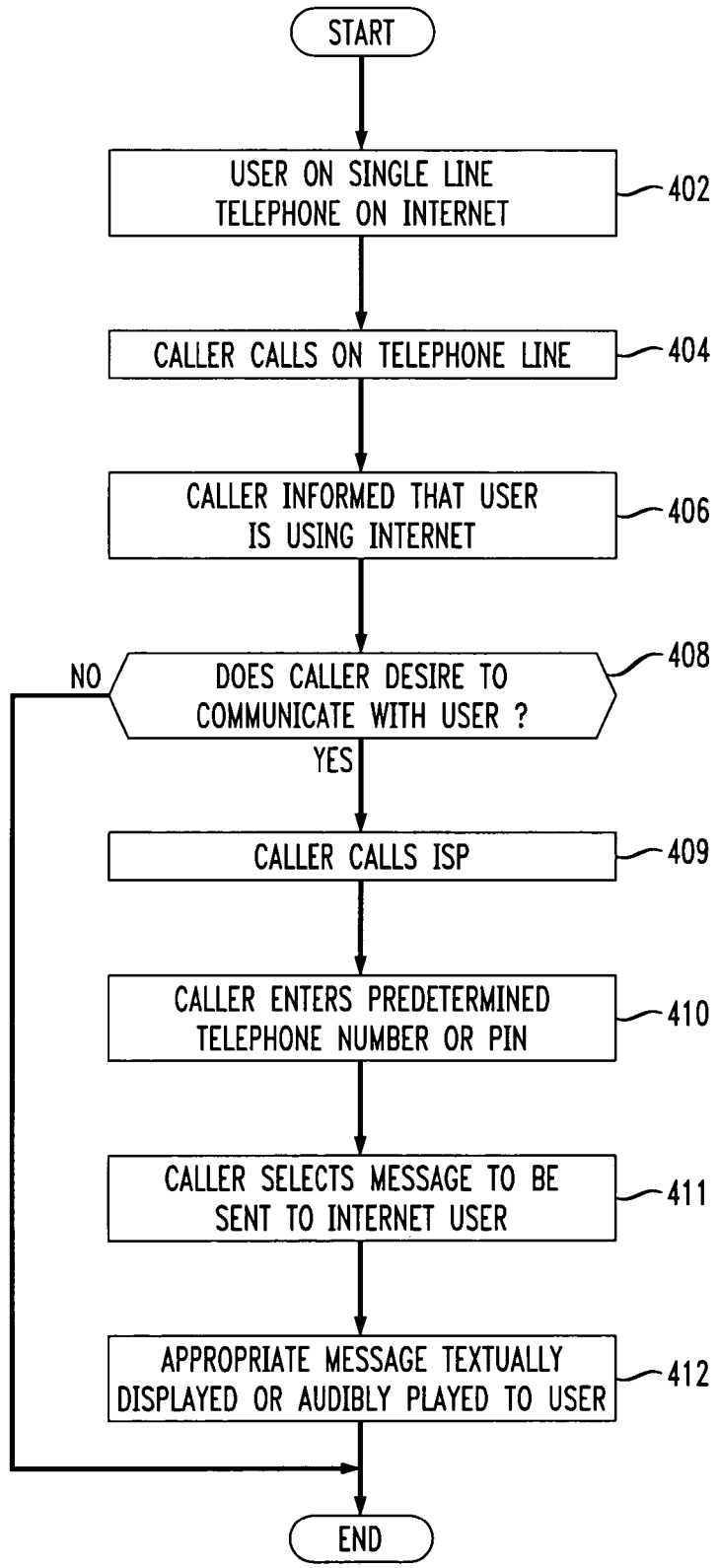
FIG. 4 is a flow chart illustrating an exemplary process by which a user of a telephone system is notified of a desire for a particular caller to call in to the user utilizing the same telephone line already in use to connect to the Internet, in accordance with the principles of the present invention.

FIG. 4 shows an example of the operation of the notification to an Internet user of a requested interruption in their Internet session, in accordance with the principles of the present invention.

In particular, with reference to step 402 of FIG. 4, the Internet user access and connects to the Internet.

In step 404, the caller unsuccessfully attempts to connect a telephone call to the Internet user.

In step 406, the caller is informed by the telephone company central office that the Internet user is currently likely accessing the Internet over the called telephone line 107.

In decision step 408, the caller decides whether or not they wish to request an Internet session interruption with a notification message.

If yes, in step 409 the caller calls the ISP 109 of the Internet user, and in step 410, the caller enters the special designated, predetermined number identifying the Internet user.

In step 411, the caller selects an appropriate notification message to be sent to the Internet user, and in step 412, the appropriate message is textually displayed and/or audibly played to the user.

Thus, in accordance with the principles of the present invention, the apparatus and method allows a caller to gain the attention of an Internet user of a single line telephone by dialing their Internet service provider, and identifying the Internet user to be notified. Once the calling party dials into the Internet service provider, the calling party can notify the user of the single line telephone device that they are trying to establish a voice telephone call with the Internet user.

The apparatus and method of the present invention expands the abilities of a single line telephone system when the user of the single line telephone system is using the Internet.

While the invention has been described with reference to the exemplary embodiments thereof, those skilled in the art will be able to make various modifications to the described embodiments of the invention without departing from the true spirit and scope of the invention.

What is claimed is:

1. Apparatus for notifying a called-but-busy party of an incoming telephone call attempt over a telephone line while the same telephone line is in use, comprising:
    an Internet communication module; and
    a message formatter;
    wherein said Internet communication module is adapted to cause said message formatter to send a personalized notification message recorded by a remote telephone user to an Internet interface across said telephone line via TCP/IP protocol upon request from said remote telephone user while said same telephone line is in use by said Internet interface.

2. The apparatus for notifying a called-but-busy party of an incoming telephone call attempt over a telephone line while the same telephone line is in use according to claim 1, wherein:
    said remote telephone user is a central office.

3. The apparatus for notifying a called-but-busy party of an incoming telephone call attempt over a telephone line while the same telephone line is in use according to claim 1, wherein:
said remote telephone user is attempting to establish a telephone call with said called-but-busy party.

4. The apparatus for notifying a called-but-busy party of an incoming telephone call attempt over a telephone line while the same telephone line is in use according to claim 1, further comprising:
a call related information receiver;
wherein call related information regarding a calling party is included with said notification message.

5. The apparatus for notifying a called-but-busy party of an incoming telephone call attempt over a telephone line while the same telephone line is in use according to claim 1, wherein:
said call related information receiver is a Caller ID receiver.

6. The apparatus for notifying a called-but-busy party of an incoming telephone call attempt over a telephone line while the same telephone line is in use according to claim 1, further comprising:
said notification message is a textual message.

7. The apparatus for notifying a called-but-busy party of an incoming telephone call attempt over a telephone line while the same telephone line is in use according to claim 6, wherein:
said textual message is an e-mail message.

8. The apparatus for notifying a called-but-busy party of an incoming telephone call attempt over a telephone line while the same telephone line is in use according to claim 1, further comprising:
said notification message includes an audibly playable data file.

9. The apparatus for notifying a called-but-busy party of an incoming telephone call attempt over a telephone line while the same telephone line is in use according to claim 1, wherein:
said audibly playable data file automatically plays when received on a computer terminal connected to said Internet interface.

10. The apparatus for notifying a called-but-busy party of an incoming telephone call attempt over a telephone line while the same telephone line is in use according to claim 1, further comprising:
a data signal detector adapted to detect likely Internet usage of said same telephone line.

11. The apparatus for notifying a called-but-busy party of an incoming telephone call attempt over a telephone line while the same telephone line is in use according to claim 10, wherein:
said notification message includes information regarding likely Internet usage of said same telephone line.

12. A method for notifying a called-but-busy party of an incoming telephone call attempt over a telephone line while the same telephone line is in use by an Internet interface that a calling, comprising:
uniquely identifying a called-but-busy party via a telephone call; and
notifying an Internet interface through a personalized notification message transmitted over said same telephone line using TCP/IP protocol while said called-but-busy party is busy due to said Internet interface being active on said same telephone line, said personalized notification message being recorded by a calling party and indicating that said calling party is requesting access to said called-but-busy party over said same telephone line.

13. The method for notifying a called-but-busy party of an incoming telephone call attempt over telephone line while the same telephone line is in use by an Internet interface according to claim 12, further comprising:
receiving a notification request from said calling party.

14. The method for notifying a called-but-busy party of an incoming telephone call attempt over a telephone line while the same telephone line is in use by an Internet interface according to claim 12, further comprising:
receiving a notification request from a central office.

15. The method for notifying a called-but-busy party of an incoming telephone call attempt over a telephone line while the same telephone line is in use by an Internet interface according to claim 12, further comprising:
determining at a central office a likelihood that said Internet interface of said called-but-busy party is busy using said same telephone line.

16. The method for notifying a called-but-busy party of an incoming telephone call attempt over an Internet user of a telephone line while the same telephone line is in use by an Internet interface according to claim 12, wherein:
said notification is an e-mail message.

17. The method for notifying a called-but-busy party of an incoming telephone call attempt over a telephone line while the same telephone line is in use by an Internet interface according to claim 12, wherein:
said notification is an audibly playable message.

18. A method for notifying an Internet interface connected to of a telephone line that a calling party is attempting to connect with a called-but-busy party connected to the same telephone line, comprising:
determining at central office a likelihood that a said Internet interface is using said same telephone line;
notifying said attempted calling party of said likelihood determined by said central office; and
giving said calling party an opportunity to send said Internet interface a personalized message via TCP/IP protocol over said same telephone line, said personalized message being recorded by said calling party while said Internet interface is using said same telephone line.

19. Apparatus for notifying a called-but-busy party of an incoming telephone call attempt over a telephone line while the same telephone line is in use by an Internet interface, comprising:
means for uniquely identifying an Internet interface used by a called-but-busy party via a telephone call; and
means for notifying said uniquely identified Internet interface over said same telephone line via TCP/IP protocol that said calling telephone is requesting access to said called-but-busy party over said same telephone line through a personalized message recorded by said calling party while said same telephone line is in use by said Internet interface.

20. The apparatus for notifying a called-but-busy party of an incoming telephone call attempt over a telephone line while the same telephone line is in use by an Internet interface according to claim 19, further comprising:
means for receiving a notification request from said calling party.

21. The apparatus for notifying a called-but-busy party of an incoming telephone call attempt over an Internet user of a telephone line while the same telephone line is in use by an Internet interface according to claim 19, further comprising:

means for receiving a notification request from a central office.

22. The apparatus for notifying a called-but-busy party of an incoming telephone call attempt over a telephone line while the same telephone line is in use by an Internet interface according to claim 19, further comprising:
means for determining at a central office a likelihood that said Internet interface of said called-but-busy party is busy using said same telephone line.

23. The apparatus for notifying a called-but-busy party of an incoming telephone call attempt over a telephone line while the same telephone line is in use by an Internet interface according to claim 19, wherein:
said notification is an e-mail message.

24. The apparatus for notifying a called-but-busy party of an incoming telephone call attempt over of a telephone line while the same telephone line is in use by an Internet interface according to claim 19, wherein:
said notification is an audibly playable message.

25. Apparatus for notifying an Internet interface connected to a telephone line that a calling party is attempting to connect with a called-but-busy party connected to the same telephone line, comprising:
means for determining at a central office a likelihood that said Internet interface is busy using said same telephone line; and
means for notifying with a personalized message recorded by said calling party via TCP/IP protocol over said busy telephone line, of said calling party's attempt to connect with said called-but-busy party.

26. Apparatus for notifying a called-but-busy party of an incoming telephone call attempt over a telephone line while the called-but-busy party is accessing the Internet over the same telephone line, comprising:
a specially designated, predetermined telephone number center adapted to receive a call from a caller with a desire to send a notification message to a called-but-busy party accessing said Internet; and
a message formatter;
wherein said specially designated, predetermined telephone number center is adapted to cause said message formatter to send a notification message to said called-but-busy party upon request from a remote telephone user.

27. The apparatus for notifying a called-but-busy party of an incoming telephone call attempt over a telephone line while the called-but-busy party is accessing the Internet over the same telephone line according to claim 26, wherein:
said remote telephone user is a party trying to establish a telephone call with said called-but-busy party.

28. The apparatus for notifying a called-but-busy party of an incoming telephone call attempt over a telephone line while the called-but-busy party is accessing the Internet over the same telephone line according to claim 26, further comprising:
a call related information receiver;
wherein call related information regarding a calling party is included with said notification message.

29. The apparatus for notifying a called-but-busy party of an incoming telephone call attempt over a telephone line while the called-but-busy party is accessing the Internet over the same telephone line according to claim 28, wherein:
said call related information receiver is a Caller ID receiver.

30. The apparatus for notifying a called-but-busy party of an incoming telephone call attempt over a telephone line while the called-but-busy party is accessing the Internet over the same telephone line according to claim 26, further comprising:
said notification message is a textual message.

31. The apparatus for notifying a called-but-busy party of an incoming telephone call attempt over a telephone line while the called-but-busy party is accessing the Internet over the same telephone line according to claim 30, wherein:
said textual message is an e-mail message.

32. The apparatus for notifying a called-but-busy party of an incoming telephone call attempt over a telephone line while the called-but-busy party is accessing the Internet over the same telephone line according to claim 26, further comprising:
said notification message includes an audibly playable data file.

33. A method for notifying an Internet user of a telephone line that a calling party is attempting to connect with said Internet user, comprising:
uniquely identifying an Internet user via a telephone call; and
notifying said Internet user though a specially designated, predetermined telephone number center, adapted to receive a call from said calling party with a desire to send a notification message to said Internet user, that said calling party is requesting access to said Internet user over said telephone line.

34. The method for notifying an Internet user of a telephone line that a calling party is attempting to connect with said Internet user according to claim 33, further comprising:
receiving a notification request from said calling party.

35. The method for notifying an Internet user of a telephone line that a calling party is attempting to connect with said Internet user according to claim 33, further comprising:
receiving a notification request from a central office.

36. The method for notifying an Internet user of a telephone line that a calling party is attempting to connect with said Internet user according to claim 33, further comprising:
determining at a central office a likelihood that said Internet user is connected with said Internet.

37. The method for notifying an Internet user of a telephone line that a calling party is attempting to connect with said Internet user according to claim 33, wherein:
said notification is an e-mail message.

38. The method for notifying an Internet user of a telephone line that a calling party is attempting to connect with said Internet user according to claim 33, wherein:
said notification is an audibly playable message.

39. Apparatus for notifying an Internet user of a telephone line that a calling party is attempting to connect with said Internet user, comprising:
means for uniquely identifying an Internet user via a telephone call; and
means for notifying said uniquely identified user that said calling party is requesting access to said Internet user over said telephone line through though a specially designated, predetermined telephone number center adapted to receive a call from said calling party with a desire to send a notification message to said Internet user.

40. The apparatus for notifying an Internet user of a telephone line that a calling party is attempting to connect with said Internet user according to claim 39, further comprising:

means for receiving a notification request from said calling party.

41. The apparatus for notifying an Internet user of a telephone line that a calling party is attempting to connect with said Internet user according to claim 39, further comprising:

means for receiving a notification request from a central office.

42. The apparatus for notifying an Internet user of a telephone line that a calling party is attempting to connect with said Internet user according to claim 39, further comprising:

means for determining at a central office a likelihood that said Internet user is connected with said Internet.

43. The apparatus for notifying an Internet user of a telephone line that a calling party is attempting to connect with said Internet user according to claim 39, wherein:

said notification is an e-mail message.

44. The apparatus for notifying an Internet user of a telephone line that a calling party is attempting to connect with said Internet user according to claim 39, wherein:

said notification is an audibly playable message.

\* \* \* \* \*